United States Patent [19]

Mikami

[11] Patent Number: 5,364,923
[45] Date of Patent: Nov. 15, 1994

[54] ORGANOPOLYSILOXANE GRAFT EPOXY RESINS AND A METHOD FOR THE PREPARATION THEREOF

[75] Inventor: Ryozo Mikami, Chiba, Japan

[73] Assignee: Dow Corning Toray Silicone Co., Ltd., Tokyo, Japan

[21] Appl. No.: 127,855

[22] Filed: Sep. 28, 1993

[30] Foreign Application Priority Data

Sep. 30, 1992 [JP] Japan ................. 4-285577

[51] Int. Cl.$^5$ ............................................. C08G 77/04
[52] U.S. Cl. ........................................ 528/27; 528/38; 528/93; 528/119; 525/102
[58] Field of Search .............. 528/27, 38, 93, 119; 525/102

[56] References Cited

U.S. PATENT DOCUMENTS

| | | | |
|---|---|---|---|
| 3,496,139 | 2/1970 | Markovitz | 528/27 |
| 3,674,891 | 7/1972 | Wheeler, Jr. | 525/474 |
| 4,075,153 | 2/1978 | Leo | 523/443 |
| 4,233,428 | 11/1980 | Endo | 525/507 |
| 4,657,986 | 4/1987 | Isayama et al. | 528/27 |
| 4,707,529 | 11/1987 | Hoffman et al. | 528/27 |
| 4,754,014 | 6/1988 | Ryntz et al. | 528/27 |
| 4,952,643 | 8/1990 | Hirose et al. | 525/476 |
| 4,988,778 | 1/1991 | Chang et al. | 528/27 |
| 5,024,893 | 6/1991 | Hanada et al. | 428/423.1 |

FOREIGN PATENT DOCUMENTS

| | | |
|---|---|---|
| 8849 | 2/1981 | Japan . |
| 48544 | 10/1986 | Japan . |
| 280215 | 12/1987 | Japan . |
| 1772 | 1/1989 | Japan . |
| 2616 | 10/1990 | Japan . |

*Primary Examiner*—Melvyn I. Marquis
*Assistant Examiner*—Randy Gulakowski
*Attorney, Agent, or Firm*—Timothy J. Troy

[57] ABSTRACT

The present invention relates to an organopolysiloxane graft epoxy resin comprising a reaction product of (A) an epoxy resin having at least two epoxy groups in its molecule and (B) an amino modified polyorganosiloxane. The compositions of the present invention are characterized by superior surface lubricity after curing, superior release properties, and superior water repellency. The present invention also relates to a method of making an organopolysiloxane graft epoxy resin.

20 Claims, No Drawings

ORGANOPOLYSILOXANE GRAFT EPOXY RESINS AND A METHOD FOR THE PREPARATION THEREOF

BACKGROUND OF THE INVENTION

The present invention relates organopolysiloxane graft epoxy resins and a method for the preparation thereof.

Epoxy resins modified with an organopolysiloxane are well known in the art. For example, a composition containing a diorganopolysiloxane, both ends of which are modified with an amino group, along with an epoxy resin, is described in Japanese Patent Publication No. 56-8849 [8,849/81]. In said composition, said diorganopolysiloxane modified with amino groups and the epoxy resin undergo a reaction at the time of curing the epoxy resin, and the moisture resistance of the epoxy resin is said to be improved.

Also, in Japanese Patent Publication No. 61-48544 [48,544/86], a composition comprising a block copolymer of a diorganopolysiloxane, both ends of which are modified with amino groups, and an epoxy resin, is disclosed. The block copolymer is believed to be an effective additive for improvement in the cracking resistance of curable epoxy resins.

However, all of these epoxy resins modified with an organopolysiloxane are block copolymers of an organopolysiloxane and an epoxy resin. Therefore, the characteristics of the organopolysiloxane, for example, the water repellency, surface lubricity, and release properties are not adequately exhibited in some cases, and it was not possible to use them in some applications. Therefore, recently, graft-type organopolysiloxane copolymers have gained special attention. For example, an organopolysiloxane-grafted polyurethane resin is disclosed in Japanese Patent Application Laid-Open [Kokai or Unexamined] No. 2-616, and a dimethylpolysiloxane-grafted polyacrylate resin is disclosed in Japanese Patent Application Laid-Open [Kokai or Unexamined] No. 64-1772 [1772/89].

SUMMARY OF THE INVENTION

The present invention relates to an organopolysiloxane graft epoxy resin comprising a reaction product of (A) an epoxy resin having at least two epoxy groups in its molecule and (B) an amino modified organopolysiloxane. The present invention further relates to a method of making an organopolysiloxane graft epoxy resin comprising reacting (A) and (B) at a temperature above room temperature. It is preferred in the method of this invention that the molar ratio of component (A) to component (B) is greater than or equal to 1.

An objective of the present invention is to produce a new organopolysiloxane graft epoxy resin, and to produce a method for the preparation thereof.

Another object of the present invention is to produce an epoxy resin having superior lubricity after curing, superior release properties, and superior water repellency.

A further object of the present invention is to produce a coating material which when applied to a metal or painted surface exhibits improved hydrophobic and water repellency properties so that it can be used as, for example, a polish or car wax.

These and other features, objects and advantages of the present invention will be apparent upon consideration of the following detailed description of the invention.

DETAILED DESCRIPTION OF THE INVENTION

The present invention relates to an organopolysiloxane graft epoxy resin comprising a reaction product of (A) an epoxy resin having at least two epoxy groups in its molecule and (B) an organopolysiloxane having the general formula

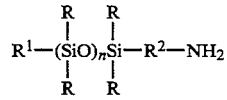

wherein R and $R^1$ represent monovalent hydrocarbon radicals, $R^2$ represents a divalent hydrocarbon radical, and n represents a number greater than 3.

For the epoxy resin component (A) that can be used in the present invention, it is important that it contain at least two epoxy groups in its molecule. The epoxy resin is a known material, and many different conventional types can be used without special restrictions on the molecular structure or molecular weight. For example, an epoxy resin synthesized from epichlorohydrin and bisphenol, or various types of novolac resins, alicyclic epoxy resins, and epoxy resins that include halogens such as chlorine or bromine can be used.

The organopolysiloxane of component (B) that can be used in the present invention is an organopolysiloxane having the general formula

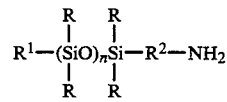

wherein R and $R^1$ represent monovalent hydrocarbon radicals, $R^2$ represents a divalent hydrocarbon radical, and n represents a number greater than 3. The monovalent hydrocarbon radicals of R and $R^1$ can be alkyl groups such as methyl groups, ethyl groups, propyl groups, and butyl groups, aryl groups such as phenyl groups, tolyl groups, and xylyl groups, aralkyl groups such as benzyl groups and phenethyl groups, hydrocarbon halide groups such as chloromethyl groups and 1,1,1-trifluoropropyl groups. From the standpoint of availability, it is preferred that 80% of R and $R^1$ groups be methyl. The divalent hydrocarbon radicals of $R^2$ can be alkylene groups such as ethylene groups, propylene groups, and pentylene groups, as well as phenylene groups and cyclohexylene groups. The degree of polymerization of the organopolysiloxane used for component (B) is not especially limited as long as it is greater than 3, but in order to achieve good compatibility with the epoxy resin of component (A) and a good reactivity, a degree of polymerization greater than 200 is not desirable. Methods of making organopolysiloxanes having one end modified with an amino group are well known in the art. For example, they can be produced by performing a desilylation reaction after performing an adduct reaction between a dimethylpolysiloxane containing hydrogen bonded to the silicon on one end or produced by performing a nonbalanced polymerization of hexamethylcyclotrisiloxane and a silylated allylamine. Methods such as these are disclosed in Japanese Patent Application Laid-Open [Kokai or Unexamined] No. 2-42090 [42090/90].

The present invention further relates to a method of making an organopolysiloxane graft epoxy resin comprising (I) mixing: (A) an epoxy resin having at least two epoxy groups in its molecule and (B) an organopolysiloxane having the general formula

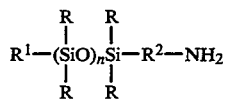

wherein R and $R^1$ represent monovalent hydrocarbon radicals, $R^2$ represents a divalent hydrocarbon radical, and n represents a number greater than 3, and (II) heating the mixture of (I) at a temperature above room temperature. It is preferred in the method of this invention that the molar ratio of component (A) to component (B) be greater than or equal to 1. For the method of this invention, R, $R^1$, $R^2$, and n are as described hereinabove including preferred embodiments thereof.

The polysiloxane of component (B) contains two active hydrogens bonded to a nitrogen atom capable of reacting with the epoxy groups in the epoxy resin of component (A) and thus component (B) acts as a chain extender. The molar ratio between component (A) and component (B) becomes an important factor at the time of the reaction. It is possible to control the degree of polymerization of the organopolysiloxane graft epoxy resin by changing the molar ratio. In order to synthesize an organopolysiloxane graft epoxy resin with a high degree of polymerization, the molar ratio is preferably close to 1, and in order to synthesize an organopolysiloxane graft epoxy resin with a low degree of polymerization, the molar ratio is considerably greater than 1. In order to confirm the contribution of the active hydrogens bonded with the nitrogen, it is desirable to perform the chain-extending reaction under conditions in which the molar ratio of component (A) to component (B) is greater than 1.

In the present invention, it is possible to perform the intended chain-extending reaction when component (A) and component (B) are mixed and heated. The temperature used for the chain-extending reaction is above room temperature, and preferably below 200° C., with a range of 60°–150° C. being desirable from the standpoint of a reduced reaction time.

Also, it is desirable to perform the chain-extending reaction with an organic solvent. It is needed to perform the reaction efficiently, since the compatibility between component (A) and component (B) is low and is generally poor. For the solvent, those capable of dissolving component (A) and component (B) are used, for example, aromatic hydrocarbons such as benzene, toluene, and xylene; ethers such as diethyl ether and tetrahydrofuran; and acetic acid esters such as ethyl acetate and Cellosolve acetate, can be used effectively.

In the following, the present invention is further explained in detail with application examples. In the application examples, parts represents parts by weight.

EXAMPLE 1

10 parts (0.0111 mol) of bisphenol epoxy resin having an epoxy equivalence of 450 and an average molecular weight 900 (YD-011 from Toto Kasei (Ltd)), 42 parts (0.0111 mol) of a dimethylpolysiloxane having a molecular weight of 3780 and having the general formula

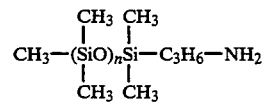

and 208 parts of xylene were charged in a 4-necked flask with a capacity of 500 mL equipped with a stirrer, thermometer, and condenser. The mixture was heated to 140° C. in approximately 10 minutes, then a reaction was carried out under reflux conditions. Sampling was done every 2 hours. The organic solvent was evaporated and the reaction was continued until the sample became transparent. After the reaction, the xylene was removed, producing a dimethylpolysiloxane graft epoxy resin that remained solid at room temperature.

The results of measurements by gel permeation chromatography (referred to as GPC hereinafter) indicated that the number-average molecular weight of said epoxy resin was 7480 and the weight-average molecular weight was 15934.

The dimethylpolysiloxane graft epoxy resin produced was dissolved in octamethylcyclotetrasiloxane, producing an octamethylcyclotetrasiloxane solution containing 10 wt % of said epoxy resin. Said solution was uniformly coated onto the painted surface of an automobile to form a thin film. An excellent water repellency was observed on the surface of the coated object. Also, the water repellency was observed after 2 months, exhibiting an excellent durability of the water repellency.

EXAMPLE 2

10 parts (0.0125 mol) of bisphenol brominated epoxy resin having an epoxy equivalence of 400 and an average molecular weight of 800 (YDB 400 from Toto Kasei (Ltd)), 23.7 parts (0.0063 mol) of a dimethylpolysiloxane having a molecular weight of 3780 and having the general formula

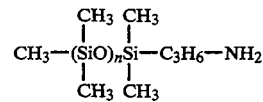

and 20 parts of xylene were charged in a 200 mL, 4-necked flask equipped with a stirrer, thermometer, and condenser. The mixture was heated to 140° C. in approximately 10 min, then a reaction was carried out under reflux conditions. Sampling was done every 2 hours. The organic solvent was evaporated and the reaction was continued until the sample became transparent. After the reaction, the xylene was removed, producing a dimethylpolysiloxane grafted epoxy resin that remained solid at room temperature.

The results of measurements by GPC indicated that the number-average molecular weight of said epoxy resin was 7724.

The dimethylpolysiloxane grafted epoxy resin produced was dissolved in tetrahydrofuran, producing a 10-wt % solution. 3.4 parts of cyclohexylaminopropylmethyldimethoxysilane hydrolysate were mixed with 100 parts of the effective copolymer component, producing a curable composition. The curable composition was further diluted, and a 0.5-wt % solution of the effective component was used for the treatment of a polyester staple. Afterwards, a heat treatment was carried out at 130° C. for 10 min. Subsequently, the coefficient of friction between each fiber in the treated polyester staple was examined. Also, for comparison, the coefficient of friction between each fiber in a nontreated polyester staple was examined. The results are shown in Table I. As shown in the results, the dimethylpolysiloxane graft epoxy resin of the present invention is a superior fiber-treatment agent, and superior lubricity was provided to the polyester staple.

TABLE I

| EVALUATION | POLYESTER TREATMENT AGENT | |
|---|---|---|
| | PRESENT INVENTION | UNTREATED |
| COEFFICIENT OF STATIC FRICTION | 0.121 | 0.308 |
| COEFFICIENT OF DYNAMIC FRICTION | 0.101 | 0.201 |

It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. A composition comprising a reaction product of:
   (A) an epoxy resin having at least two epoxy groups in its molecule; and
   (B) an organopolysiloxane having the general formula

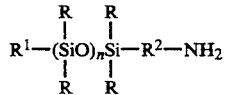

wherein R and $R^1$ represent monovalent hydrocarbon radicals, $R^2$ represents a divalent hydrocarbon radical, and n represents a number greater than 3.

2. A composition according to claim 1, wherein the composition further comprises (C) a solvent.

3. A composition according to claim 2, wherein the solvent is selected from the group consisting of aromatic hydrocarbons, ethers, and acetic acid esters.

4. A composition according to claim 3, wherein the aromatic hydrocarbons are selected from the group consisting of benzene, toluene, and xylene.

5. A composition according to claim 3, wherein the ethers are selected from the group consisting of diethyl ether and tetrahydrofuran.

6. A composition according to claim 3, wherein the acetic acid esters are selected from the group consisting of ethyl acetate and Cellosolve acetate.

7. A composition according to claim 1, wherein R and $R^1$ are selected from the group consisting of alkyl groups, aryl groups, aralkyl groups, and hydrocarbon halide groups.

8. A composition according to claim 7, wherein the alkyl groups are selected from the group consisting of methyl, ethyl, propyl, and butyl.

9. A composition according to claim 7, wherein the aryl groups are selected from the group consisting of phenyl, tolyl, and xylyl.

10. A composition according to claim 7, wherein the aralkyl groups are selected from the group consisting of benzyl and phenethyl.

11. A composition according to claim 7, wherein the hydrocarbon halide groups are selected from the group consisting of chloromethyl and 1,1,1-trifluoropropyl.

12. A composition according to claim 1, wherein $R^2$ is an alkylene group.

13. A composition according to claim 12, wherein the alkylene group is selected from the group consisting of ethylene, propylene, pentylene, phenylene, and cyclohexylene groups.

14. A composition according to claim 1, wherein n has a value of from 3 to 200.

15. A method of making an organopolysiloxane graft epoxy resin comprising
   (I) mixing:
      (A) an epoxy resin having at least two epoxy groups in its molecule; and
      (B) an organopolysiloxane having the general formula

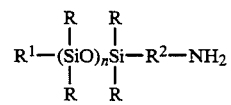

wherein R and $R^1$ represent monovalent hydrocarbon radicals, $R^2$ represents a divalent hydrocarbon radical, and n represents a number greater than 3; and
   (II) heating the mixture of (I) at a temperature above room temperature.

16. A method according to claim 15, wherein the method further comprises adding a solvent to the mixture of (I).

17. A method according to claim 15, wherein the mixture of (I) is heated at a temperature ranging from 60°–200° C.

18. A method according to claim 16, wherein the solvent is selected from the group consisting of aromatic hydrocarbons, ethers, and acetic acid esters.

19. A method according to claim 15, wherein R and $R^1$ are selected from the group consisting of alkyl groups, aryl groups, aralkyl groups, and hydrocarbon halide groups.

20. A method according to claim 15, wherein $R^2$ is an alkylene group.

* * * * *